United States Patent
Roberts et al.

(10) Patent No.: US 10,878,068 B2
(45) Date of Patent: *Dec. 29, 2020

(54) METHODS AND APPARATUS FOR AUTHENTICATION IN AN ELECTRONIC DEVICE

(71) Applicant: Cirrus Logic International Semiconductor Ltd., Edinburgh (GB)

(72) Inventors: Ryan Roberts, Hertfordshire (GB); Michael Page, Gloucestershire (GB)

(73) Assignee: Cirrus Logic, Inc., Austin, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/667,828

(22) Filed: Aug. 3, 2017

(65) Prior Publication Data

US 2018/0039768 A1 Feb. 8, 2018

Related U.S. Application Data

(60) Provisional application No. 62/370,456, filed on Aug. 3, 2016.

(30) Foreign Application Priority Data

Oct. 5, 2016 (GB) .................................. 1616897.3

(51) Int. Cl.
*G06F 21/32* (2013.01)
*G06F 21/82* (2013.01)
(Continued)

(52) U.S. Cl.
CPC .............. *G06F 21/32* (2013.01); *G06F 21/82* (2013.01); *G10L 17/24* (2013.01); *H04L 63/0861* (2013.01)

(58) Field of Classification Search
CPC .................................. G06F 21/32; G10L 17/24
See application file for complete search history.

(56) References Cited

U.S. PATENT DOCUMENTS 6,691,089 B1 * 2/2004 Su .......................... G06F 21/32
704/244
10,075,437 B1 9/2018 Costigan
(Continued)

FOREIGN PATENT DOCUMENTS

| EP | 1521161 A2 | 4/2005 |
| EP | 3026667 A1 | 6/2016 |

(Continued)

OTHER PUBLICATIONS

International Search Report and Written Opinion of the International Searching Authority, International Application No. PCT/GB2017/052251, dated Nov. 23, 2017.
(Continued)

*Primary Examiner* — Harunur Rashid
(74) *Attorney, Agent, or Firm* — Jackson Walker L.L.P.

(57) ABSTRACT

An authentication system, comprising: one or more inputs, for receiving biometric input signals from a user; a routing module, configured to selectively route the biometric input signals from the one or more inputs to one or more of a plurality of components, the plurality of components including a biometric authentication module, for processing the biometric input signals and generating an authentication result; and a security module, for receiving a control instruction for the routing module, determining whether or not the control instruction complies with one or more rules, and controlling the routing module based on the control instruction responsive to a determination that the control instruction complies with the one or more rules.

29 Claims, 4 Drawing Sheets

(51) Int. Cl.
*G10L 17/24* (2013.01)
*H04L 29/06* (2006.01)

(56) References Cited

U.S. PATENT DOCUMENTS

| | | | |
|---|---|---|---|
| 2002/0174348 A1 | 11/2002 | Ting | |
| 2003/0163739 A1 | 8/2003 | Armington et al. | |
| 2005/0071635 A1* | 3/2005 | Furuyama | G06F 21/32 |
| | | | 713/168 |
| 2006/0020792 A1 | 1/2006 | Weiss | |
| 2006/0274166 A1* | 12/2006 | Lee | H04N 5/765 |
| | | | 348/231.99 |
| 2007/0281761 A1 | 12/2007 | Kim | |
| 2009/0005891 A1 | 1/2009 | Batson et al. | |
| 2009/0238418 A1 | 9/2009 | Sato | |
| 2013/0226586 A1 | 8/2013 | Jang et al. | |
| 2013/0246800 A1* | 9/2013 | Stewart | G06F 21/32 |
| | | | 713/176 |
| 2015/0035643 A1 | 2/2015 | Kursun | |
| 2015/0088509 A1 | 3/2015 | Gimenez et al. | |
| 2015/0161370 A1* | 6/2015 | North | G07C 9/00158 |
| | | | 726/5 |
| 2015/0332057 A1* | 11/2015 | Chang | G06F 12/1433 |
| | | | 726/26 |
| 2016/0005038 A1 | 1/2016 | Kamal et al. | |
| 2016/0087976 A1* | 3/2016 | Kaplan | H04L 713/156 |
| | | | 713/156 |
| 2016/0094338 A1 | 3/2016 | Pappachan et al. | |
| 2016/0099969 A1* | 4/2016 | Angus | H04L 9/3268 |
| | | | 713/158 |
| 2016/0324478 A1 | 11/2016 | Goldstein | |
| 2016/0364559 A1* | 12/2016 | Bali | G06F 21/32 |
| 2017/0180386 A1 | 6/2017 | Dewan et al. | |

FOREIGN PATENT DOCUMENTS

| | | | |
|---|---|---|---|
| GB | 2388947 | A | 11/2003 |
| WO | 9900720 | A2 | 1/1999 |
| WO | 0232308 | A1 | 4/2002 |
| WO | 2008111340 | A1 | 9/2008 |
| WO | 2010066269 | A1 | 6/2010 |
| WO | 2016200523 | A1 | 12/2016 |

OTHER PUBLICATIONS

Combined Search and Examination Report under Sections 17 and 18(3), Application No. GB1715273.7, dated Feb. 21, 2018.
Combined Search and Examination Report under Sections 17 and 18(3), Application No. GB1616897.3, dated Apr. 5 2017.
Search and Examination Report under Sections 17 and 18(3), Application No. GB1616897.3, dated Jul. 26, 2017.
Search Report under Section 17, UKIPO, Application No. GB1621717.6, dated Jun. 14, 2017.
International Search Report and Written Opinion of the International Searching Authority, International Application No. PCT/GB2017/053328, dated Jan. 25, 2018.
Andreou, "Chapter 1, Switch-based logic functions," Retrieved from the Internet: <URL: https://web.archive.org/web/20150629212237/https://www.ece.jhu.edu/~andreou/216/Archives/2014/Handouts/POP_Ch1-2.pdf> (Year: 2015).
Rouse, Margaret, "FIDO (Fast Identity Online)", Retrieved from the Internet: <URL: https://web.archive.org//web/20150418061110/https://searchsecurity.techtarget.com/definition/FIDO-Fast-Identity-Online> (Year: 2015).
International Search Report and Written Opinion of the International Searching Authority, International Application No. PCT/GB2017/052249, dated Dec. 6, 2017.
Combined Search and Examination Report under Sections 17 and 18(3), Application No. GB1616899.9, dated Apr. 5, 2017.
Search Report under Section 17(6), Application No. GB1616899.9, Claims 47-52, dated Jul. 26, 2017.
Search Report under Section 17(6), Application No. GB1616899.9, Claims 18-31, dated Jul. 26, 2017.

* cited by examiner

METHODS AND APPARATUS FOR AUTHENTICATION IN AN ELECTRONIC DEVICE

TECHNICAL FIELD

Examples of the present disclosure relate to methods and apparatus for authentication in an electronic device, and particularly relate to methods and apparatus for authenticating the voice of a user of an electronic device.

BACKGROUND

The growing demand for more secure, more reliable and more convenient user authentication solutions for mobile devices is accepted and publicized in the industry.

It is expected that biometrics will replace passwords, particularly on mobile platforms, as long passwords are difficult to remember and difficult to type on such devices. For example, in order to improve user experience, many manufacturers of mobile phones have embedded fingerprint sensors in their recent devices, and it is expected that users will increasingly adopt biometrics in order to access their device and/or specific functions thereon. Other types of biometric authentication include iris recognition and voice recognition. Multiple different types of authentication (e.g. passwords, fingerprint/iris/voice recognition, etc) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. The user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more threatening technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

A mechanism is therefore required to defend biometric authentication systems against such software-based attacks.

SUMMARY

One particular form of malware identified as a threat by the present inventors may be able to reconfigure signal paths so as to allow direct injection of recorded or spoof biometric data or interference signals into the input of a biometric authentication module and thus allow the third-party attacker access to the devices on which it is installed.

According to one aspect of the disclosure, there is provided an authentication system, comprising: one or more inputs, for receiving biometric input signals from a user; a routing module, configured to selectively route the biometric input signals from the one or more inputs to one or more of a plurality of components, the plurality of components including a biometric authentication module, for processing the biometric input signals and generating an authentication result; and a security module, for receiving a control instruction for the routing module, determining whether or not the control instruction complies with one or more rules, and controlling the routing module based on the control instruction responsive to a determination that the control instruction complies with the one or more rules.

Another aspect provides an electronic device comprising an authentication system as set out above.

A further aspect provides an electronic device comprising: one or more input devices for acquiring input signals from a user of the electronic device; and a speaker recognition processor, connected to the one or more input devices and providing sole access to the one or more input devices, comprising a biometric authentication module for processing the input signals and generating a biometric authentication result.

Another aspect provides a speaker recognition processor integrated circuit, comprising: one or more signal inputs for receiving microphone input signals; one or more interfaces for outputting audio data; biometric authentication module; a routing module operable to route said microphone input signals to at least one of said biometric authentication module and said one or more interfaces according to the contents of a control register; a set of storage registers containing respective predetermined control register contents for each of a plurality of use cases; and a control interface for receiving an indication of one or more requested use cases.

One aspect provides an integrated circuit comprising: a voice biometric module; one or more microphone inputs; and a routing module coupled to the one or more microphone inputs, and configured to selectively output microphone input signals to a signal path comprising the voice biometric module.

A further aspect provides an electronic device, comprising an integrated circuit as set out above.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
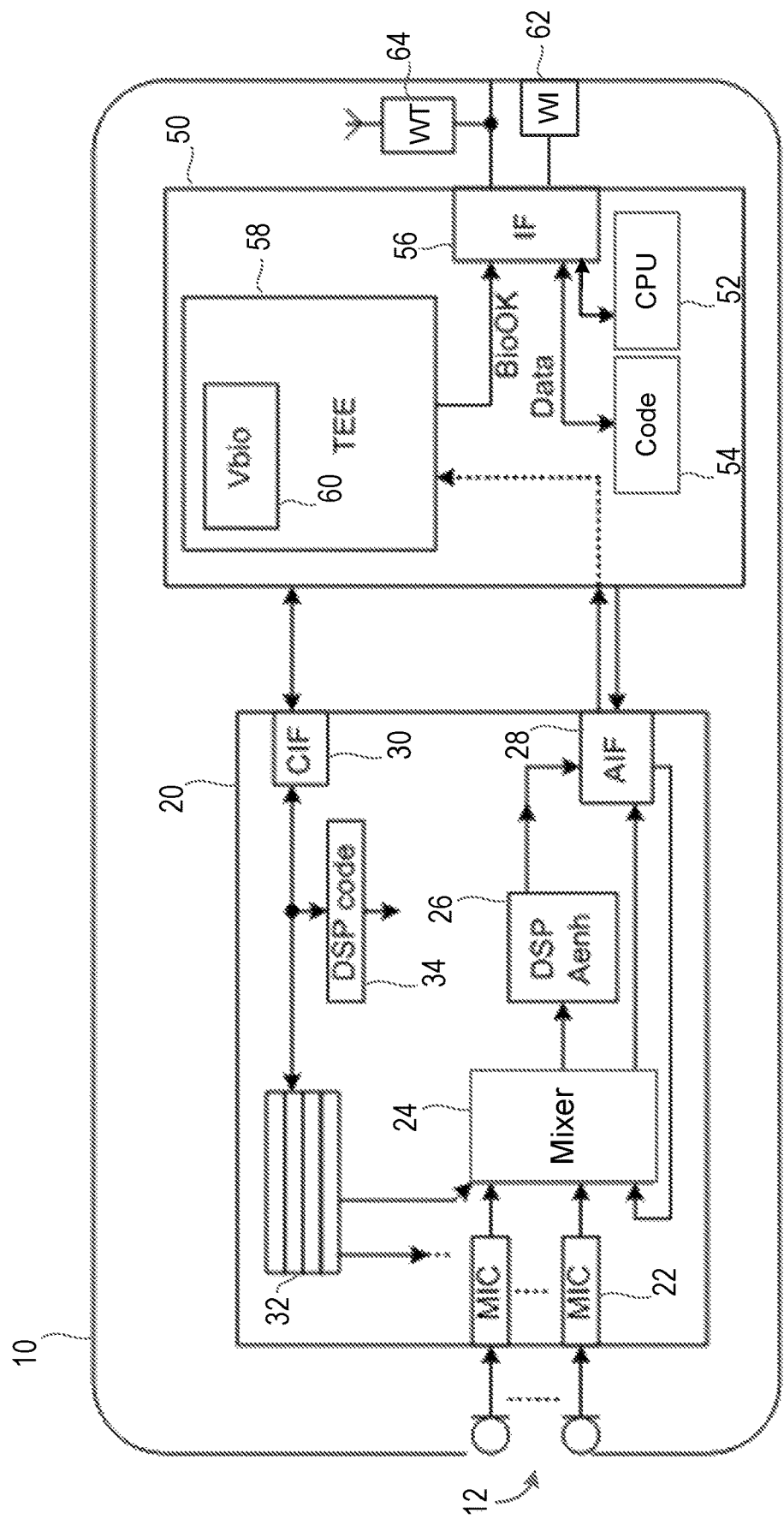
FIG. 1 shows an example of an electronic device.

FIG. 1 shows an example of an electronic device 10, which may for example be a mobile telephone or a mobile computing device such as laptop or tablet computer. The device comprises one or more microphones 12 for receiving voice input from the user, a codec circuit 20 connected to the microphones 12, and an application processor (AP) 50 connected to the codec 20.

The microphones 12 are shown positioned at one end of the device 10. However, the microphones may be located at any convenient position on the device, and may capture more sources of sound than simply the user's voice. For example, one microphone may be provided primarily to capture the user's voice, while one or more other microphones may be provided to capture surrounding noise and thus enable the use of active noise cancellation techniques. To enable speakerphone mode in mobile telephones, or in other devices, for example lap-top computers, multiple microphones may be arranged around the device 10 and configured so as to capture the user's voice, as well as surrounding noise.

The codec 20 comprises one or more inputs 22 for receiving audio data from the microphones 12. Circuitry associated with an input 22 may comprise analog-to-digital convertor circuitry for receiving signals from analog microphones. In the illustration, a single input 22 is provided for the data from each microphone 12. In other arrangements, however, a single input 22 may be provided for more than one, or even all, of the microphones 12.

The codec 20 further comprises a routing module 24 in communication with one or more registers 32. Routing module 24 may be configurable to accept audio data from selected one or more inputs 22 and route this data to respective routing module outputs. Routing module 24 may be configurable to provide on any requested one or more routing module outputs a mix of input audio data from respective selected any two or more of the inputs 22, and thus may additionally comprise a mixing module or mixer. Routing module 24 may be configurable to apply respective defined gains to input or output audio data.

The registers 32 may store values specifying at which outputs the routing module 24 is to output audio data, which input or combination of inputs 22 each output audio data is to be based on and with what respective gain before or after mixing. Each of the registers 32 may be explicitly read from and written to by the AP 50 via a digital control interface 30 on the codec 20 (and a corresponding interface, not illustrated, on the AP 50). The register addresses and values may be controlled by driver software executed in the AP 50.

For example, audio data of the user's voice may be required for the device 10 to operate normally as a telephone. In that case, the mix-routing module 24 may be controlled so as to output audio voice data directly to an audio interface 28 (from where it can be output to the AP 50, for example). Other modes of operation may also require that the audio data be output directly to the audio interface 28. For example, when the device 10 additionally comprises one or more cameras, it may be used to record video. In that mode of operation, again audio data may be routed directly to the audio interface 28 to be output to the AP 50.

The AP 50 may itself provide audio data to the routing module 24 via the audio interface 28. For example, the device 10 may comprise one or more speakers (not illustrated) to output audio to the user (under control of the AP 50). That audio output may be detected by the microphones 12 and cause unwanted echoes in the audio signals acquired by the microphones. In order to negate these effects, the audio data to be output via the speakers may be provided by the AP 50 as an input to the routing module 24 via the audio interface 28. The output audio can then be cancelled, if required, from the audio data acquired by the microphones 12. In another example, an attenuated version of a voice microphone signal may be added to the signal to be reproduced by a speaker to provide a side-tone component to the user.

In another mode of operation, the routing module 24 may output audio data to a digital signal processor (DSP) 26 configured to enhance the audio data in one or more ways. For example, the device 10 may employ a voice biometric algorithm to provide security for one or more operations of the device 10, i.e. by authenticating the identity of the user of the device when carrying out certain sensitive operations. Voice biometric analysis may require or benefit from pre-processing of the audio data in order to achieve adequate accuracy. For example, the DSP 26 may employ one or more noise reduction techniques to mitigate or cancel background noise and so increase the signal-to-noise ratio of the audio data. The DSP may use beamforming techniques to improve the quality of the audio data. In general, these techniques require data from multiple microphones 12 and thus the routing module 24 may output audio data from multiple microphones to the DSP 26. Those skilled in the art will appreciate that many algorithms may be carried out by the DSP 26 in order to enhance and amplify those portions of the audio data corresponding to the user's voice. The present disclosure is not limited to any particular algorithm or set of algorithms.

After processing the audio data, the DSP 26 may then output the processed data to the audio interface 28, either directly as illustrated or via the routing module 24.

As mentioned above, the codec 20 comprises a control interface 30 for receiving control signals from the AP 50. Control interface 30 may also be used to load DSP code 34 (for example to be executed in the DSP 26) from the AP into the codec 20, for example on start-up. The control interface 30 may implement any suitable communication specification, such as serial peripheral interface (SPI).

The AP 50 comprises a central processing unit (CPU) 52 and memory 54 providing registers and a cache. The CPU 52 and memory 54 are in communication with an interface (IF) 56 that couples the AP 50 to other components of the device. For example, the device 10 may comprise one or more components that allow the device to be coupled in a wired or wireless fashion to external networks, such as a wired interface (WI) 62 (e.g. a USB interface) or a wireless transmitter (WT) module 64 to provide wireless connection to one or more networks (e.g. a cellular network, a local Bluetooth® or a wide area telecommunication network). The device 10 may also comprise one or more storage components providing memory on a larger scale. These components are largely conventional and are therefore not described in any detail.

The AP 50 further comprises a trusted execution environment (TEE) 58 or other similar secure processing zone. The TEE 58 provides an isolated execution environment in which more sensitive processes can be carried out at a higher level of security than processes handled in the main CPU 52. For example, the TEE 58 may process only instructions that have been provided via a secure channel, for instance via data authentication, whereas the CPU may process instructions requiring less security, and avoid needless overhead of unwarranted security precautions.

For example, the TEE 58 may comprise a voice biometric authentication module 60, for providing biometric authentication of a user's voice. The biometric module 60 may receive audio data from the codec 20 via the audio interface 28, optionally after pre-processing by the DSP 26, and carry out biometric authentication in order to generate an authentication result. The biometric module 60 may have access to one or more databases allowing the user's voice to be identified from the audio data. The databases may comprise a universal background model (UBM), a cohort model, and/or a biometric voice print (BVP) for one or more authorised users.

One or more operations of the device 10 may require biometric authentication of the user before they can be carried out. For example, biometric authentication of the user may be required for one or more of: carrying out a financial transaction using the device 10 (e.g. via a banking or wallet app installed on the device); accessing encrypted communications such as encrypted e-mails; changing security settings of the device; allowing access to the device via a lock screen; turning the device on, or otherwise changing a power mode of the device (such as waking from sleep mode). The set of operations requiring biometric authentication may be configurable by the user, so as to apply a level of security that the user is comfortable with.

When required, therefore, the device 10 may enter a voice authentication mode in which audio data is acquired via the microphones 12, routed and processed by the routing module and the DSP 26, and output to the voice biometric authentication module 60 via the audio interface 28. The biometric module 60 carries out biometric authentication of the audio data, generates an authentication result ("BioOK"), and outputs the result for use by the device 10. The authentication result may be output from the device 10 to an external network or server. If the authentication result is positive (i.e. providing an indication that the audio input is that of an authorised user of the device), the device 10 (or the external server) may permit the restricted operation to be carried out. If the authentication result is negative (i.e. providing an indication that the audio input is not that of an authorised user of the device), the device 10 (or the external server) may not permit the restricted operation to be carried out.

One problem that has been identified with the device 10 shown in FIG. 1 arises when speaker authentication is required to turn the device on, or otherwise change a power mode of the device (such as waking from sleep mode). The codec 20 may have a low-power "always-on" or "Listen" mode in which it monitors for the presence of an input voice signal which may be a possible voice trigger. However, the processor 50 is a complex sub-system and will be at least mainly powered down.

When the codec detects a possible voice trigger it will respond with a signal to the processor 50 for it to inspect the signal sample and verify the user (e.g. using biometric module 60). However, the processor 50 is a complex subsystem and may take several seconds to boot up into a state where it can perform the voice authentication. This delay is unacceptable for many potential users.

A further problem that has been identified with the device 10 shown in FIG. 1 is the potential for malware (that is, malicious software installed on the device) to hijack audio data acquired by the microphones and bypass or "spoof" the biometric module 60. For example, the malware may run in an insecure area of the AP 50 (i.e. outside the TEE 58) and load false audio data into the input signal path of the codec 20. The false audio data may relate to some downloaded or otherwise synthesized speech sample intended to trick the biometric module 60 into generating a positive biometric result and permitting a restricted operation. The malware may hijack a signal path in the codec to acquire voice data relating to a genuine user of the device (for example during a genuine voice biometric authentication process) and store it in an insecure part of the AP 50. This sample may later be injected into the signal path for example via the AIF 28 to trick the biometric module into authorising an otherwise restricted operation.

Figure 2:
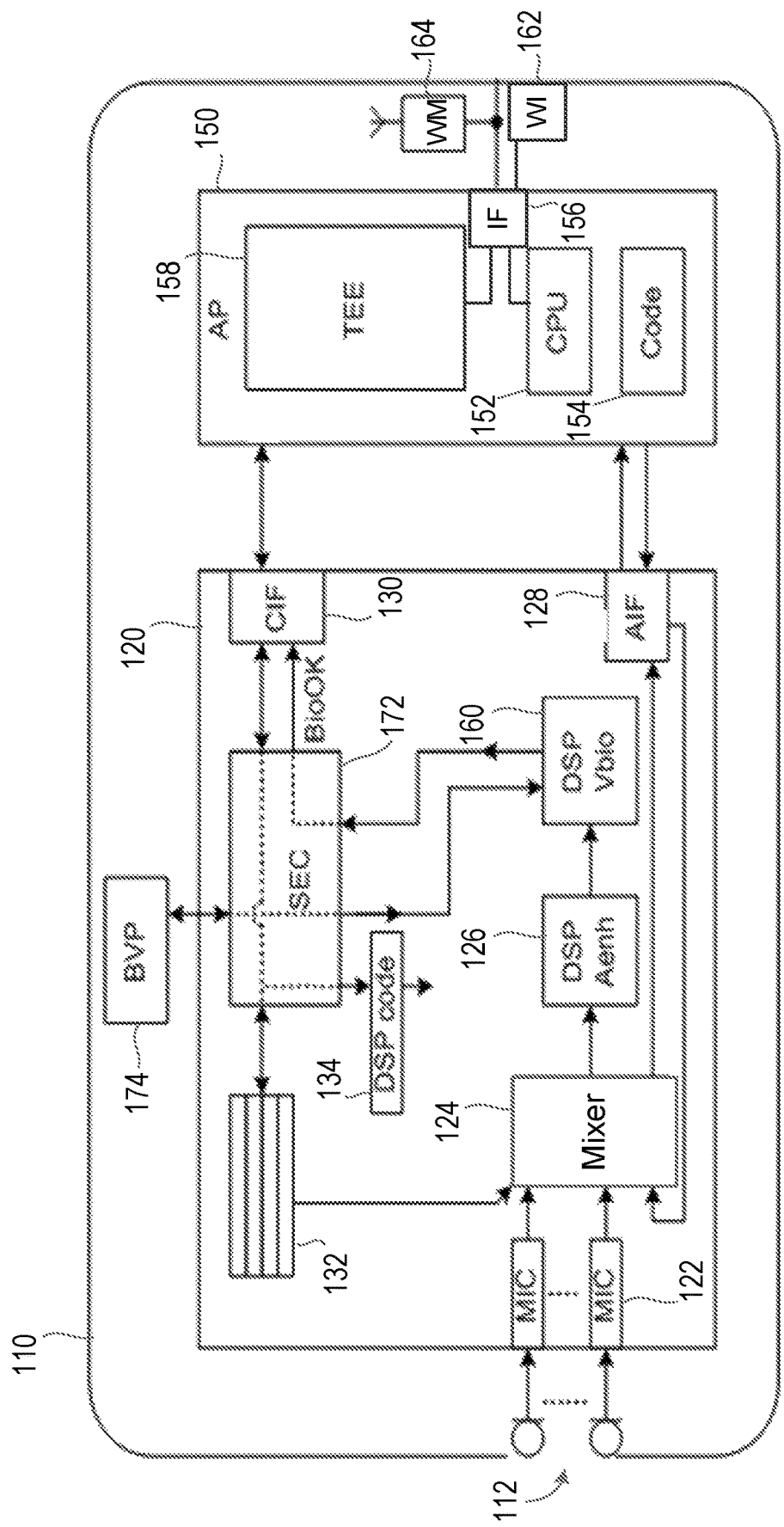
FIG. 2 shows an electronic device according to embodiments of the invention.

FIG. 2 shows a device 110 according to embodiments of the invention, intended to overcome one or more of these problems.

The device 110 again comprises one or more microphones 112, a speaker recognition processor (SRP) 120, and an applications processor (AP) 150.

The SRP 120 differs from the codec 20 shown in FIG. 1 in a number of respects. For example, the SRP 120 comprises a security module 172 that may be configured to control access to registers of the SRP 120 and thus prevent unauthorised access (such as may be attempted by a processor infected with malware).

Further, in the embodiment illustrated in FIG. 2, the biometric authentication module 160 is removed from the AP 150 and placed in the SRP 120 itself. Thus, according to some embodiments of the invention, biometric data acquired during an authentication process is never passed outside the SRP 120 to the AP 150, thus preventing unauthorised copying of the data for example by malware on the AP for later use in spoofing the authentication process.

These and other aspects of the invention will be described in greater detail below.

In its overall architecture, the device 110 is substantially similar to the device 10 described with respect to FIG. 1 and may comprise one or more microphones 112, and an AP 150. Device 110 comprises a Speaker Recognition Processor (SRP) 120. In some embodiments, the microphones 112 and the SRP 120 are arranged such that all signal paths from the microphones 112 pass through the SRP 120; that is, other components in the device 110 (e.g. the AP 150) can access the microphones 112 only through the SRP 120. The SRP 120 may be provided on a single chip (i.e. integrated circuit), separate from the AP 150, and communicate with the AP 150 over one or more internal buses of the device 110.

The AP 150 comprises a CPU 152 and cache/registers 154. The AP 150 additionally comprises an interface (IF) 156 for communicating with a wired interface (WI) 162 (e.g. a USB interface) and a wireless modem (WM) 164 of the device 110. The AP 150 can communicate with the SRP 120 via an audio interface 128 and a control interface 130. For example, control signals may be generated by the CPU 152 and sent to the SRP 120 via the control interface 130. Audio signals, such as those generated for output at one or more speakers of the device 110 (not illustrated) may be passed to the SRP 120 via the audio interface 128. AP 150 may comprise a Trusted Execution Environment (TEE) 158 for use for other purposes, but as noted above, in this embodiment the biometric authentication module 160 is advantageously located in the SRP 120, rather than requiring any TEE 158.

The SRP 120 comprises one or more inputs 122 for receiving audio data from the microphones 112. In some embodiments, circuitry in SRP 120 associated with one or more of inputs 122 may comprise analog-to-digital convertor (ADC) circuitry for receiving signals from analog microphones. In some embodiments, one or more of inputs 122 may comprise a digital interface for accepting signals from digital microphones. Such digital interfaces may comprise standard 1-bit pulse-density-modulated (PDM) data streams, or may comprise other digital interface formats. Some or all of microphones 112 may be coupled to inputs 122 directly, or via other circuitry, for example ADCs or a codec, but in all cases such inputs are still defined as microphone inputs in contrast to inputs used for other purposes. In the illustration, a corresponding input 122 is provided for the data from each microphone 112. In other arrangements, however, an input 122 may receive data from more than one, or even from all, of the microphones 112, for instance as a time-multiplexed digital signal.

The SRP 120 further comprises a routing module 124 in communication with one or more routing registers 132, which receives the audio data from the inputs 122. The inputs 122 may be connected only to the routing module 124 such that no other components are able to directly access the signals on inputs 122.

The routing module 124 routes or mixes or applies gains to audio data received from the inputs 122, in dependence on values stored in routing registers 132, to one or more routing module outputs and thence to other components of the SRP 120 as required, including the biometric authentication module. The routing module 124 may additionally receive and process input audio data from an audio interface 128.

In one arrangement, registers 132 may comprise a bank of dedicated physically separate register banks. In other arrangements, registers 132 may comprise an area of general RAM dedicated in design or dynamically, e.g. on start-up or initialisation of device 110. Registers 132 may comprise a master-slave arrangement in which master registers are written as control data is received, then corresponding slave registers updated simultaneously on receipt of a further command. Some "register" bits may be implemented as local individual latches physically located close to the actual routing logic.

In one output signal path from the routing module 124, the SRP 120 comprises a digital signal processor (DSP) 126 configured to enhance the audio data in one or more ways. Those skilled in the art will appreciate that many algorithms may be carried out by the DSP 126 in order to enhance and amplify those portions of the audio data corresponding to the user's voice. The present disclosure is not limited to any particular algorithm or set of algorithms. For example, the DSP 126 may employ one or more noise reduction techniques to mitigate or cancel background noise and so increase the signal-to-noise ratio of the audio data. The DSP may use beamforming techniques to improve the quality of the audio data. In general, these techniques require data from multiple microphones 112 and thus the routing module 124 may output audio data from multiple microphones via the signal path to the DSP 126.

Thus the signal path from microphones 122 may comprise multiple strands from the microphones to the DSP 126. Similarly, the output from the DSP may comprise multiple strands, for example carrying information corresponding to different audio signal frequency bands. Thus the term signal path should be considered to denote the general flow of information from possibly multiple parallel sources to multiple parallel destinations, rather than necessarily a single wired connection for example. In some embodiments a portion of such a signal path may be defined in terms of controlled read and writes from a first defined set of memory locations to which input data has been supplied (e.g. from microphones 122) to a second defined set of locations in memory from which output data may be read by the next component in the signal path (e.g. by DSP 126 or biometric authentication module 160).

The signal path further comprises a voice biometric authentication module 160. The voice biometric authentication module 160 may be implemented for example as a DSP (either the same DSP 126 that carries out audio enhancement, or a different DSP). The voice authentication module 160 carries out biometric authentication on the pre-processed audio data in order to generate an authentication result.

The biometric module 160 may have access to one or more databases allowing the user's voice to be identified from the audio data. For example, the authentication module 160 may communicate with a storage module (SM) 174 containing one or more templates or other data such as a Biometric Voice Print allowing identification of the voices of one or more authorised users of the device 110. In the illustrated embodiment the BVP is stored in memory 174 outside the SRP 120. However, in other embodiments the BVP may be stored on a server that is remote from the device altogether or, conversely, stored on the SRP 120 itself. It will be further apparent that, in the illustrated embodiment, the communication between the authentication module 160 and the BVP 174 takes place via the security module 172. Further detail regarding this module will be provided below.

The precise nature of the algorithm carried out in the authentication module 160 is not relevant for a description of the invention, and those skilled in the art will be aware of the principles as well as several algorithms for performing voice biometric authentication. In general, the process may involve a comparison of parameters derived from the acquired (and optionally pre-processed) audio data to corresponding parameters stored in the BVP 174. These parameters may for instance be related to Mel-frequency cepstral coefficients (MFCC) of the audio data. To allow a parallel relative comparison against a set of other users, the authentication module 160 may also access a universal background model (UBM) and/or a cohort model as part of the authentication process, and these may be stored together with the BVP in storage module 174, which may also store firmware used to run the algorithm in the SRP.

The biometric authentication module 160 generates an authentication result BioMatch which is provided to security module 172 which may output this result in the form of a message or signal containing an indication BioOK that the acquired audio data contains the voice of an authorised user of the device 110 (and thus one or more requested restricted operations may be carried out), or an indication that the acquired audio does not contain the voice of an authorised user of the device 110 (and thus one or more requested restricted operations should not be carried out). The messaging may be protected by some form of data authentication (not to be confused with biometric authentication), for example authenticated by some key. The protection may take the form of a FIDO protocol, which allows the message to be securely relayed to a remote server via the AP, without needing to be passed into the TEE 158.

Another signal path from the routing module 124 may pass audio data directly to an audio interface 128, to be output from the SRP 120. This allows audio data to be acquired by the microphones 112 and used by the device 110 in a normal way, e.g. as a video camera, a phone, etc. For example, the audio data output via the audio interface 128 may be provided to the AP 150.

Locating the voice biometric authentication on the SRP 120 together with the routing module 124 controlling its input data and any pre-conditioning by DSP 126 results in a system in which the biometric verification process is implemented on one integrated circuit, rather than say some aspects being performed on the AP 150 and being liable to corruption by malware (that is, malicious software that may have been installed on the device surreptitiously) or by other unintended interaction between biometric authorization and any of the multiple application processes that may be running on AP 150.

The audio data stream used for biometric authorization never leaves the SRP, making it harder for investigators to reverse engineer the biometric authentication algorithm in attempts to uncover any vulnerabilities.

The BioOK signal may be transmitted in some authenticatable form, for instance controlled under a FIDO authentication protocol, avoiding any need for these signals to be passed through the TEE 158 or require special processing on the AP.

Also any signal conditioning, possibly time-varying or adaptive, for example spectral equalization, of the microphone input signal by DSPs 126 prior to biometric authentication may be conveniently taken into account locally on-chip by the biometric authentication algorithm.

Co-integrating the voice biometric authentication on the SRP 120 rather than on the AP 150 has an advantage in that, in some applications, the biometric authentication may be necessary to perform a "secure wake" of the device 110. Until a positive biometric authentication occurs, at least part of the AP 150 may be in a low-power dormant state. If the biometric authentication module 160 were on the AP, then a significant part of the circuitry on the AP would need to be activated and consume power. To further reduce power, the biometric authentication module 160 may also be placed in a low-power state until voice activity detection circuitry on SRP 120 or other upstream or parallel voice activity detection circuitry detects the presence of voice components in the microphone signal.

The SRP 120 further comprises a control interface 130 via which control signals can be received (e.g. from the AP 150) and via which control signals can be sent (e.g. to the AP 150). The physical interface may be some standard data protocol, for example SPI. The control signals may comprise an opcode defining the general nature of a command followed by parameters associated with that command. Control signals in some embodiments may be realised by means of a logical message-oriented protocol between software-controlled endpoints layered on top of the physical control bus, The security module 172 may be coupled directly to the control interface 130 such that all control signal paths to and from the control interface 130 may pass through the security module 172. Thus all control signals received via the control interface 130 are passed to the security module 172; similarly, all control signals to be output via the control interface 130 may go via the security module 172.

The security module 172 is further connected to the routing registers 132 such that all signal paths to the routing registers 132 pass through the security module 172. DSP code 134 for the audio enhancement DSP 126 and/or the biometric authentication module 160 may be received via the control interface 130 and pass through the security module 172.

According to embodiments of the invention, the security module 172 acts to ensure that only control signals received over the control interface 130 that are deemed to be safe with respect to a defined level of security are implemented in the SRP 120. For example, the security module 172 may be configured to determine whether a received control instruction complies with one or more rules. If the control instruction complies with the one or more rules, then it can be implemented in the SRP 120; if the control instruction does not comply with one or more of the rules, then the control instruction may be rejected, and not implemented in the SRP 120.

The device 110 may be operable in a variety of "use cases", for example biometric authentication, biometric enrolment, always-on listening, recording, playback, telephone voice call and so forth. These use cases may be requested by user input via an interface, such as a touch screen, or an external stimulus such as an externally originated telephone call. Each use case may require particular signal paths to be established by the routing module 124, controlled by routing registers 132. In some situations there may be multiple use cases active concurrently. For example, during playback of audio files via the AP 150, audio interface 128 and the SRP 120 to loudspeakers (not illustrated), a use case of listening for voice commands may still be active.

In some embodiments, there may be a set of register settings defined for each anticipated use case. Each register setting may be stored in the storage module 174 or may be stored within a memory in the SRP 120. The settings may be loaded into this storage during manufacture of the SRP 120 or device 110, and this storage may be non-volatile storage to allow these settings to be retained during device power-down. Transition from one of these use cases to another may be initiated by commands from the AP 150 received by the security module 172. These transitions may be managed by a Use Case Manager (UCM) service within the security module. On receiving a request for initiation of a use case, this service will first check whether the requested combination of use cases is allowable (i.e. whether the newly requested use case is allowable in combination with existing use cases being implemented). Thus in some embodiments the one or more rules implemented by the security module 172 may comprise a determination as to whether a requested combination of use cases is allowable. In some embodiments a list of allowable combinations may be pre-defined during system design and stored in the SRP 120 or associated storage module 174. In some embodiments the service may be configured according to a Finite State Machine, with a state defined for each anticipated combination of use cases and a pre-defined limited set of transitions from each use case combination to other use case combinations. The details and sequencing of each such transition may be defined in and implemented in terms of a respective Use Case Transition script. Thus in some embodiments the one or more rules implemented by the security module 172 may comprise a determination as to whether a requested use-case transition is allowable, i.e. whether a transition from one or more current use cases to one or more requested use cases (where one or more use cases may be common to both current and requested use cases) is allowable.

For example, the device might be in a "secure voice wake listening" use case, where it is listening for a keyword to be uttered. In that use case, the AP 150 may request that the microphones be streamed to it so that the AP 150 can use the microphone signals for some other use case (e.g. audio context logging). As this may be an allowable use case transition, the UCM service accepts the control message received over the CIF 130 and transitions to the "secure voice wake listening+microphone streaming" state. The transition is performed by writing to appropriate physical registers in the hardware (e.g. registers 132) to set up the new routing to the AIF 128. However, if the UCM was in the "voice biometrics enrolment" state at the time the "stream mics" message was received then it may reject the requested use-case transition, recognising that it would be invalid (or insecure) to perform both use cases concurrently, as this would allow the AP 150 to "snoop" and obtain a copy of audio data provided to the voice biometric authentication module 160. The transition may be rejected either due to this use case combination not being present in the pre-defined list of allowable combinations, or simply because the transition between these use cases is not present in the finite state machine. In that case, such a control message received on CIF 130 may be rejected.

In either class of embodiment, only when the Use Case Manager has determined that a use case combination, or a use-case transition, is allowable will it implement the additional routing paths by writing to the routing registers. Thus the AP 150 supplies SRP 120 with high level commands to transition between use case combinations.

Some use cases may be parameterised. For instance use cases requiring microphone input may be programmable to select any one of multiple microphones to be a "main" microphone, for instance determined by the orientation of the device determined by the AP 150 via inputs from other sensors in the device 110. The security module 172 may thus receive commands from the AP to select a given microphone and interpret this to change the contents of the respective routing register, albeit preferably upon a determination that the requested microphone channel is actually a valid microphone channel, rather than some other input.

In some embodiments the AP may be given access to a wider range of instructions to allow more flexibility in the possible use cases. For example, the AP 150 may be permitted to request particular routing paths or combinations thereof, with such requests being reviewed by the security module 172 before implementation of the use case if found to be allowable.

The security module 172 may be operable in a plurality of different states or modes in order to apply different standards of security as required for operation of the device 110 according to the use cases currently active or requested to be active.

For example, the security module 172 may be operable in a biometric authentication mode, in which relatively high standards of security are implemented. The biometric authentication mode may dictate, for example, that only signal paths from the routing module 124 to the biometric authentication module 160 are permitted (optionally including the audio enhancement DSP 126). In such an embodiment, any control instruction that attempted to implement a different signal path from the routing module 124 (e.g. to the audio interface 128) during the biometric authentication mode would be rejected by the security module 172.

The security module 172 may be further operable in a normal mode, in which relatively lower standards of security are implemented. For example, the normal mode may allow any signal path to be established from the routing module 124 to other components of the device 110 (e.g. including to the audio interface 128).

Thus, upon receipt of a request to activate the biometric authentication module 160, the security module 172 may perform various checks on the routing to be established, to see if the routing complies with one or more rules according to the security level desired.

Some checks may involve deducing which signal sources contribute to the signal at some destination or signal sink. For example, the security module 172 may determine whether any of the signal sources to be coupled to the biometric authentication module is not from a pre-defined set of allowable microphone inputs. This may be determined by tracing each routed signal path back to all the input signal sources (e.g. by means of a connectivity matrix reflecting the connections to each signal sink).

Some checks may involve deducing whether a particular signal source may transmit signals to undesired signal sinks. For example, the security module 172 may determine whether any member of a pre-defined set of allowable microphone inputs is routed to transmit signals to any other signal sink than the biometric authentication module. This may be determined by tracing each routed signal path forward from the particular signal source (e.g. by means of a connectivity matrix reflecting the connections from each signal source).

In some examples, strands of a signal path may flow via a DSP block. Such a DSP block may receive other signals at other inputs. It may not be practicable to determine which inputs to a DSP influence which outputs without examination of the code currently running so, in some embodiments, the security module 172 may assume that each input to a DSP may affect any output of the DSP and each output may be affected by any input.

The security level may be defined implicitly by the AP 150. For example, a command to activate the biometric authentication module 160 or even to route signals to the biometric authentication module may set the appropriate security level. Alternatively the security level may be set explicitly by the AP 150, but with safeguards so that for instance the biometric authentication module 160 may not be activated and signals routed to it unless the SRP 120 is already in an appropriate security level. Any change in security level may trigger a check of all the signal paths already configured as well as any newly-requested paths.

The routing checks may be performed by the security module 172 on each individual routing command received. Alternatively, a sequence of commands may be received and temporarily stored until a "load" command is received, at which point the requested routing is reviewed by the security module 172 and, if allowable, implemented in the routing module 124 via writes to the routing register 132.

Thus in each of these embodiments upon receiving a control instruction for the routing module 124, the security module 172 determines whether or not the control instruction complies with one or more rules, and controls the routing module 124 based on the control instruction responsive to a determination that the control instruction complies with the one or more rules. These rules may be defined in terms of a list of permissible combinations of pre-defined use cases, or the presence or absence of transition paths in a finite state machine, or by checking the signal sinks and signal sources of each requested signal paths in the context of a current security level, which security level may be defined by the processes active to enable the current use case or may be defined by explicit commands.

Figure 3:
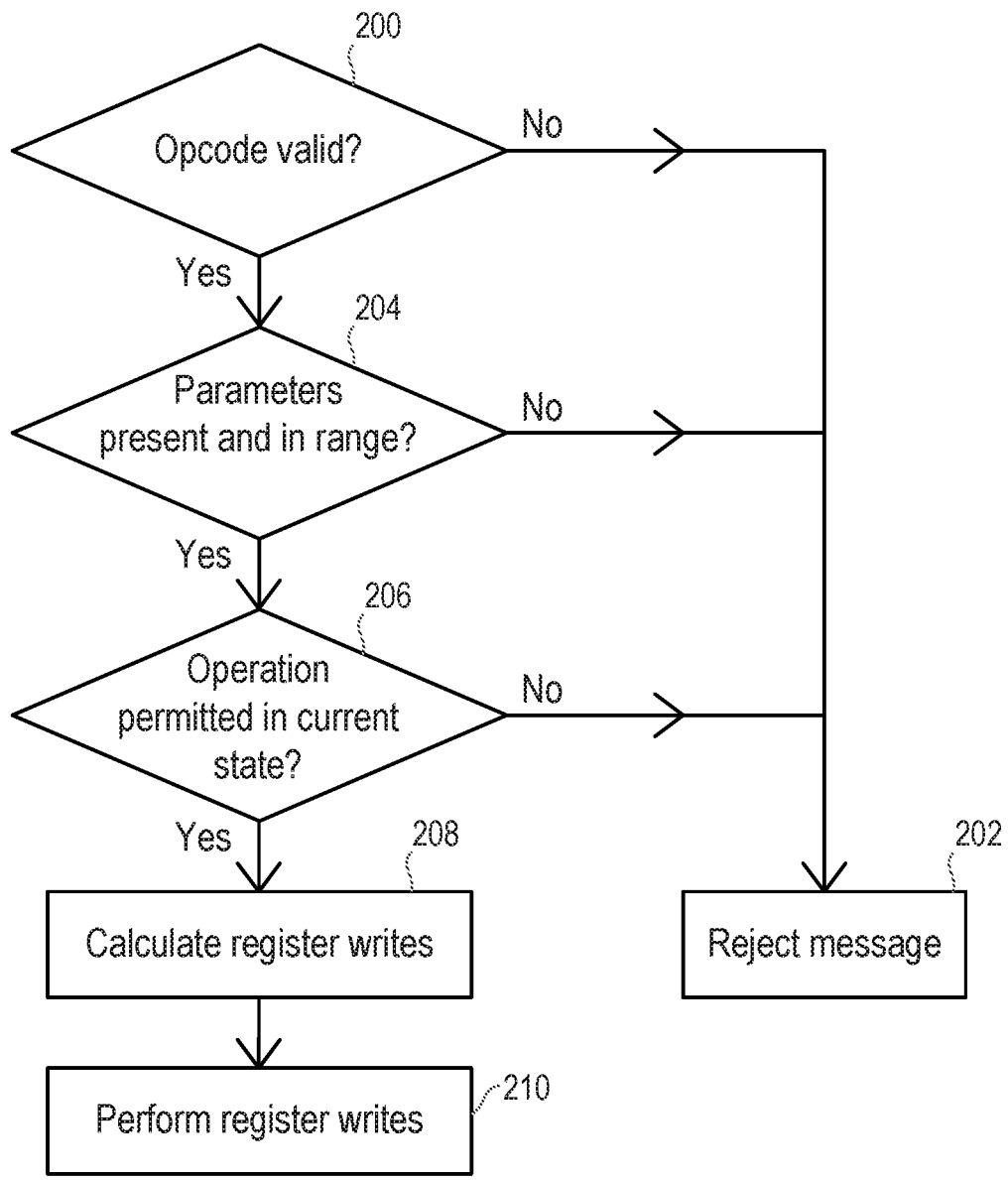
FIG. 3 is a flowchart of a method according to embodiments of the invention.

FIG. 3 is a flowchart of a method in accordance with embodiments of the invention. The method may be carried out, for example, in the security module 172.

The method begins as a control instruction is received by the security module 172. The control instruction may be received, for example, via the control interface 130 and may have originated in the AP 150 or another component of the device 110. As discussed above, the control instructions may be conveyed in various formats. For this example we consider embodiments in which the control instructions comprise an opcode.

In step 200, therefore, the opcode of the control instruction is checked to determine whether or not it is valid; that is, whether it corresponds to one of the plurality of opcodes defined in the standard format. If the opcode is not valid, the method proceeds to step 202 and the control instruction is rejected. If the opcode is valid, the method proceeds to step 204.

The opcode defines the type of operation that is mandated by the control instruction, and each opcode is generally associated with one or more parameters that define the particular operation that is to be carried out. For example, the opcode may define an operation at a high level, such as "enable mic N on audio interface". In this case the opcode may define the "enable" operation, while the parameters define the component that it is to be enabled (i.e. mic N) and the destination for the signal path (i.e. the audio interface 128). Alternatively, the opcode may define an operation at a lower level, such as a write operation. In that case, the parameters associated with the opcode may define the identity of the microphone N and the identity of the audio interface in question. Each parameter will have a permitted range of values. Other opcodes, specifying different operations, may be associated with different parameters having different ranges.

In step 204, the parameters of the control instruction are checked to see whether they correspond to the expected parameters in light of the opcode determined in step 200, i.e. whether the number of parameters in the received control instruction corresponds to the number of parameters expected for the particular opcode. If the parameters of the control instruction do correspond to the expected parameters, each parameter is checked to see whether or not it falls within the permitted range of values for that parameter.

If the parameters of the received control instruction do not correspond to the expected parameters, or if one or more of the parameters is outside its permitted range of values, the method proceeds to step 202 and the control instruction is rejected.

If the parameters of the received control instruction are all present and within range, the method proceeds to step 206, in which it is determined whether the particular operation specified in the control instruction is permitted in the current state of operation. That is, it has been described above that the security module 172 may be operable in a plurality of different states, and each state may correspond to a different level of security. In a state have a relatively high level of security, the security module 172 may implement a relatively restrictive policy in which relatively fewer operations are permitted. In a state having a relatively low level of security, the security module 172 may implement a relatively permissive policy in which a greater number of operations are permitted.

For example, in some embodiments the SRP 120 may be operable in a plurality of different use cases, for example biometric authentication, biometric enrolment, always-on listening, recording, playback, telephone voice call and so forth. These use cases may be requested by user input via an interface, such as a touch screen, or an external stimulus such as an externally originated telephone call. Each use case may require particular signal paths to be established by the routing module 124, controlled by routing registers 132. In some situations there may be multiple use cases active concurrently. For example, during playback of audio files via the AP 150, audio interface 128 and the SRP 120 to loudspeakers (not illustrated), a use case of listening for voice commands may still be active.

In some embodiments, there may be a set of register settings defined for each anticipated use case. On receiving a request for initiation of a use case, the security module 172 may check whether the requested combination of use cases is allowable (i.e. whether the newly requested use case is allowable in combination with existing use cases being implemented). Thus in some embodiments the one or more rules implemented by the security module 172 may comprise a determination as to whether a requested combination of use cases is allowable. In some embodiments a list of allowable combinations may be pre-defined during system design and stored in the SRP 120 or associated storage module 174.

In some embodiments the security module 172 may be configured according to a Finite State Machine, with a state defined for each anticipated combination of use cases and a pre-defined limited set of transitions from each use case combination to other use case combinations. The details and sequencing of each such transition may be defined in and implemented in terms of a respective Use Case Transition script. Thus in some embodiments the one or more rules implemented by the security module 172 may comprise a determination as to whether a requested use-case transition is allowable, i.e. whether a transition from one or more current use cases to one or more requested use cases (where one or more use cases may be common to both current and requested use cases) is allowable.

For example, in one embodiment as described above, the security module 172 may be operable in a biometric authentication state in which the only signal paths from the routing module 124 permitted are those to the biometric authentication module 160 (optionally via the DSP 126). During this mode of operation, any control instruction that mandated changing the signal path, or adding an additional signal path, between the routing module 124 and a different component of the device 110 (such as the audio interface 128) would not be permitted. The mode of operation may also prevent the insertion of audio data from the audio interface 128, via the routing module 124, into the signal path to the biometric authentication module 160.

The biometric authentication state thus ensures that sensitive audio data acquired during the biometric authentication process cannot be routed off-chip. The mode may further ensure that audio data not originating from the microphones 112 cannot be passed to the biometric authentication module 160 (such as may happen if malware were attempting to spoof the authentication process with stored data).

In another embodiment, the security module 172 may be operable in a normal state, in which multiple different signal paths may be established from the routing module 124. As an example, in the normal state, signal paths may be established from the routing module 124 to the DSP 126, the biometric authentication module 160 and/or the audio interface 128. For example, such a normal state may correspond to one or more active use cases in which biometric authentication is not required.

If the operation specified in the received control instruction is not permitted in the current state of operation, the method proceeds to step 202 and the control instruction is rejected. If the operation is permitted, the method proceeds to step 208 in which the necessary register writes corresponding to the control instruction are calculated (i.e. to the routing registers 132), and then step 210 in which those register writes are performed.

FIG. 3 thus sets out the steps of a method carried out in the security module 172 in response to a control instruction received over the control interface 130. The security module 172 may carry out additional tasks in the SRP 120, however.

For example, in one embodiment, the security module 172 receives an authentication result from the biometric authentication module 160 and outputs the authentication result to the control interface 130 for further handling by the device 110 (e.g. within the AP 150). In one embodiment, the security module 172 may adapt the authentication result received from the authentication module 160 to include an indication of the prevailing security state when the authentication process was carried out (e.g. normal mode, biometric authentication mode, etc).

According to embodiments of the invention, it is intended that biometric authentication should be carried out when the security module 172 is in the biometric authentication mode. This ensures, inter alia, that only signal paths between the microphones 112 and the biometric authentication module 160 are permitted when carrying out biometric authentication. However, it is possible that malware located, for example, in the AP 150, may alter the security state of the device 110 from biometric authentication mode or prevent the device 110 from entering that mode so as to bypass those security measures. By configuring the authentication result to include an indication of the prevailing security state, the security module 172 thus gives an indication to components receiving the authentication result as to the reliability of the authentication process. Those components may choose to ignore or reject authentication results that were generated while the security module 172 was in any state other than the biometric authentication state.

In other embodiments, the security module 172 may itself reject authentication results received from the authentication module 160 if the security module 172 was in any state other than the biometric authentication state when the authentication process was carried out. Alternatively, the security module 172 may replace any authentication result received from the authentication module 160 under such circumstances (particularly if the authentication was positive) with a negative authentication result, and output the negative result to the control interface 130. In this way, authentication results obtained while the security module 172 was in a relatively less-secure state (and potentially vulnerable to attack) are nullified.

Some or all of the communications with the security module 172 may be subject to encryption so as to add an additional layer of security. For example, DSP code 134 provided by the AP 150 over the control interface 130 may be encrypted and/or signed using, for example, public/private key encryption or data authentication and/or pseudorandom number generation or other known secure zone techniques in the security module 172.

Similarly, the security module 172 may receive request messages from the biometric authentication module 160 for access to the BVP and other biometric models stored in the storage module 174. Transmission of data to and from the storage module may also be subject to encryption and/or signature to prevent unauthorised accesses to sensitive information or corruption of stored models. If the request message is not properly signed and/or encrypted, it may be rejected by the security module 172.

Figure 4:
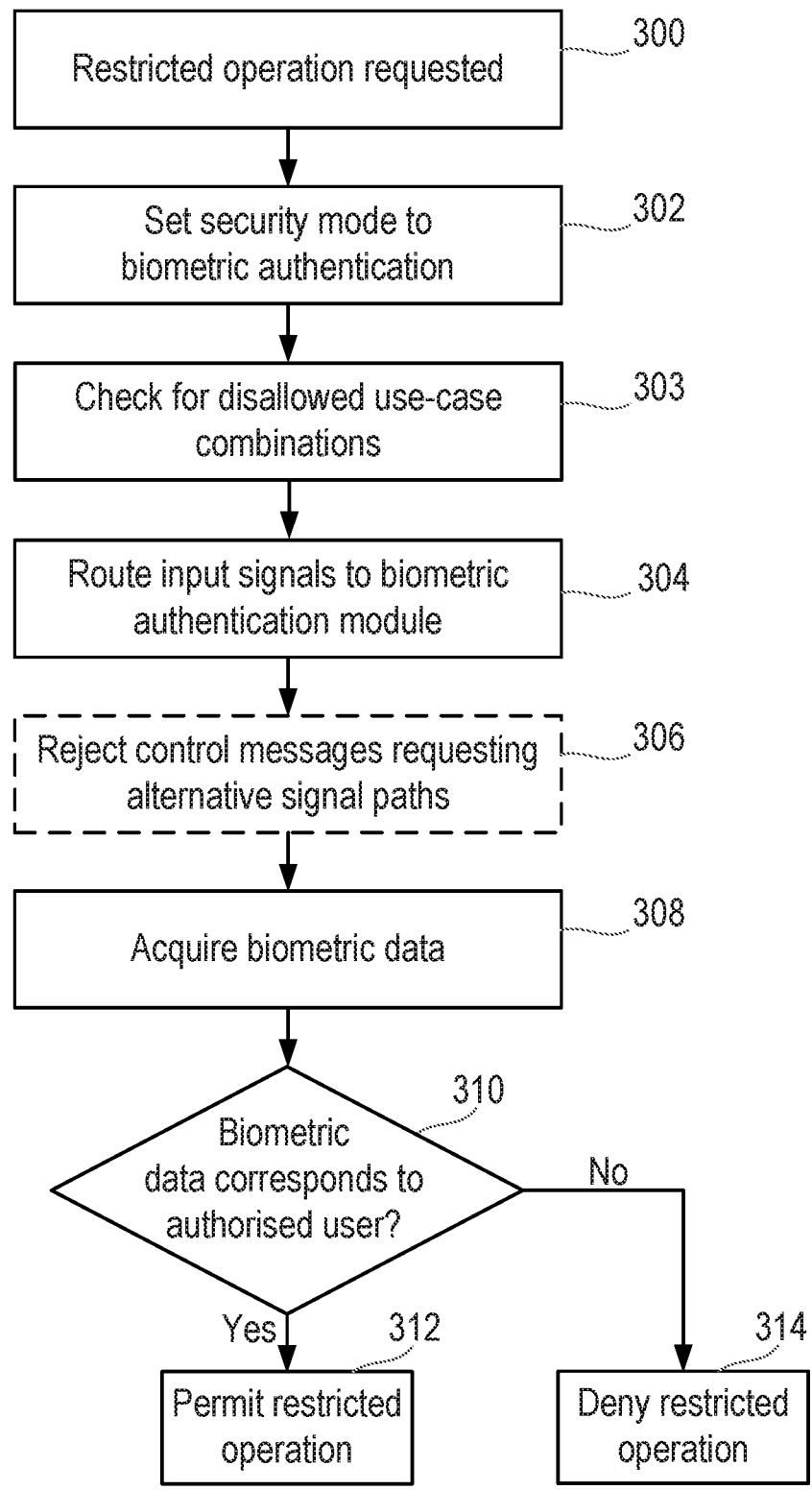
FIG. 4 is a flowchart of another method according to embodiments of the invention.

FIG. 4 is a flowchart of another method in accordance with embodiments of the invention.

The method begins in step 300 when a restricted operation is requested by a user of the device 110. A restricted operation in this instance is defined as any operation of the device that requires biometric authorisation before it can be carried out; that is, the user requesting the operation must be identified as an authorised user of the device before the operation can be carried out.

Whether or not a particular operation is a restricted operation may be configurable by the user, or predefined by a manufacturer of the device 110 or a developer of software installed on the device 110. For example, the execution of certain apps installed on the device 110 may be restricted so as to prevent unauthorised access. Banking apps, e-mail apps, messaging apps etc may all contain sensitive data that the user wishes to keep secret. The execution of certain operations within apps may be restricted. In a banking or wallet app, for example, biometric authorisation may be required if a transaction is to be carried out. Access to the device 110 itself may be restricted, such that biometric authorisation is required when the device 110 powers on, or when the device 110 displays a lock screen. These and other potential restricted operations will may be thought of by those skilled in the art. The invention is not limited to any particular circumstances in which biometric authorisation is required.

In step 302, responsive to a determination that a restricted operation has been requested, the device 110 is set to biometric authentication security mode. For example, the AP 150 may transmit an appropriate control instruction to the SRP 120, via the control interface 130, instructing the SRP 120 (and particularly the security module 172) to enter the biometric authentication mode.

As noted above, this biometric authentication security mode is associated with a relatively high level of security such that the only signal paths via the routing module 124 to the biometric authentication module 160 that are permitted are those from microphones, not other sources. Thus in Step 303 before proceeding further security module 172 may apply a rule that if any other use case is still active that might allow a signal from another source than a permitted microphone to reach the biometric authentication module, directly or indirectly, then the transition into biometric authentication security mode is aborted and the AP 150 may receive a message to notify it (or may fail to receive a message confirming the transition). Similarly the security module may apply a rule that if any other use case is still active that might allow a signal from the microphone to leave the SRP 120, for example via routing to AIF 128, then the transition is similarly aborted.

In step 304, the input signals are routed from the microphones 112, via the routing module 124, to the biometric authentication module 160. This may be achieved by writing appropriate values in the routing registers 132. The decision to route input signals in this way may be taken after receiving control instructions from the AP 150, via the control interface 130, explicitly instructing signal paths to be routed in that manner. Such control instructions would comply with the rules of the biometric authentication mode (as described above with respect to step 206), and therefore would be implemented. Alternatively, the signal paths may be routed in that manner automatically upon entering the biometric authentication mode. The instruction to enter the biometric authentication mode may thus implicitly instruct the signal paths to be routed from the microphones 112, via the routing module 124, to the biometric authentication module 160.

In step 306, any control messages that are received requesting alternative or additional signal paths (thus not complying with the rules of the biometric authentication mode) are rejected by the security module 172. Of course, such control messages may not be received, and therefore step 306 is optional.

In step 308, the user is prompted to provide some biometric voice input, which, depending on the algorithms implemented in the authentication module 160, may be a specific pass phrase or a non-specific sample of the user's voice. Note that steps 302, 304 and 308 may happen substantially simultaneously, or at least on a short time scale such that they are perceived as happening simultaneously to the user.

In step 310 the authentication module 160 receives the biometric data, carries out the biometric authentication algorithms, and determines whether or not biometric data of the user corresponds to the biometric data of an authorised user of the device 110. If it does, a positive authentication result is generated and the method proceeds to step 312 in which the restricted operation is permitted. For example, the AP 150 may implement the restricted operation directly, or send one or messages to other components of the device 110 or remote servers to implement the restricted operation.

If the biometric data of the user does not correspond to the biometric data of an authorised user of the device 110, a negative authentication result is generated and the method proceeds to step 314 in which the restricted operation is denied. For example, the AP 150 may generate feedback to the user conveying that the request operation cannot be carried out, or that the authentication was unsuccessful. The AP 150 may alternatively or additionally send one or messages to other components of the device 110 or remote servers conveying the negative authentication result.

The devices described above have focussed primarily on voice biometric authentication based on audio input received from one or more microphones. However, those skilled in the art will appreciate that the invention may be applied in a more general sense to any biometric authentication system in which malware can hijack the signal path from an input device to a biometric authentication device. For example, the invention is also applicable to iris or retinal recognition (in which case the input device or devices are cameras, and the authentication module carries out iris or retinal recognition); fingerprint recognition (in which case the input device or devices are cameras or fingerprint detectors, and the authentication module carries out fingerprint recognition); palm vein recognition (in which case the input device or devices are cameras, and the authentication module carries out palm vein pattern recognition); and face recognition (in which case the input device or devices are cameras, and the authentication module carries out face recognition).

Embodiments of the invention thus provide methods and apparatus ensuring that a biometric authentication process can be carried out in an electronic device without interference from other components of the device, such as may occur when the device has become infected with malware for example. The invention may provide a codec or speaker recognition processor, coupled to receive biometric input data, comprising a security module that prevents unauthorised control of a routing module in the codec. The security module may be implemented to prevent genuine biometric data from being output from the speaker recognition processor, and to prevent spoof biometric data from being inserted into the authentication module.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may comprise or be comprised in an electronic device, especially a portable and/or battery powered electronic device such as a mobile telephone, an audio player, a video player, a PDA, a wearable device, a mobile computing platform such as a laptop computer or tablet and/or a games device, remote control device or a toy, for example, or alternatively a domestic appliance or controller thereof including a domestic temperature or lighting control system or security system, or robot.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. An authentication system, comprising:
one or more inputs, for receiving biometric input signals from a user;
a routing module, configured to selectively route the biometric input signals from the one or more inputs to one or more of a plurality of components based on values stored in one or more control registers, the plurality of components including a biometric authentication module, for processing the biometric input signals and generating an authentication result; and
a security module, for receiving a control instruction for the routing module, the control instruction mandating one or more changes to the values stored in the one or more control registers, the security module being further for determining whether or not the control instruction complies with one or more rules, and controlling the routing module based on the control instruction responsive to a determination that the control instruction complies with the one or more rules.

2. The authentication system as claimed in claim 1, wherein the values stored in the one or more registers specify one or more inputs of the routing module at which the biometric input signals are received, and one or more respective outputs of the routing module on which the biometric input signals are output.

3. The authentication system as claimed in claim 1, wherein the security module is configured to control the routing module by writing values to the one or more registers responsive to a determination that the control instruction complies with the one or more rules.

4. The authentication system as claimed in claim 3, wherein the security module has sole write access to the one or more registers.

5. The authentication system as claimed in claim 1, wherein the authentication system is selectively operable in a plurality of use cases, with each use case comprising a respective configuration of inputs and outputs in the routing module.

6. The authentication system as claimed in claim 5, wherein the control instruction relates to the one or more use cases operative in the authentication system.

7. The authentication system as claimed in claim 6, wherein the authentication is operative in one or more first use cases, and wherein the control instruction comprises an instruction to transition to one or more second use cases.

8. The authentication system as claimed in claim 5, wherein the one or more rules comprise a list of one or more combinations of two or more use cases in which the authentication system is allowed to operate concurrently, or one or more combinations of two or more use cases in which the authentication system is prohibited from operating concurrently.

9. The authentication system as claimed in claim 5, wherein the one or more rules comprise one or more allowed use-case transitions, or one or more prohibited use-case transitions.

10. The authentication system as claimed in claim 1, wherein the plurality of components further comprises an interface for outputting the biometric input signals from the authentication system.

11. The authentication system as claimed in claim 1, wherein the security module is operable in a plurality of security levels.

12. The authentication system as claimed in claim 11, wherein each security level is associated with a different set of one or more rules for application by the security module.

13. The authentication system as claimed in claim 12, wherein one of the one or more rules for a first security level prohibits the routing of biometric input signals, or any signals based thereon, to any component other than the biometric authentication module.

14. The authentication system as claimed in claim 12, wherein one of the one or more rules for a first security level prohibits the routing of any signals other than the biometric input signals, or signals based thereon, to the biometric authentication module.

15. The authentication system as claimed in claim 11, wherein the authentication result is configured to contain an indication of the prevailing security level when the biometric input signals were processed by the biometric authentication module.

16. The authentication system as claimed in claim 1, wherein the biometric input signals are biometric voice input signals.

17. The authentication system as claimed in claim 1, wherein the biometric authentication module is configured to compare one or more features of the biometric input signals to biometric data unique to the user, stored in memory.

18. The authentication system as claimed in claim 1, wherein the authentication system is provided on a single integrated circuit.

19. The authentication system as claimed in claim 18, wherein the biometric authentication module is also provided on the single integrated circuit.

20. An electronic device comprising an authentication system as claimed in claim 1.

21. The electronic device as claimed in claim 20, further comprising an application processor in communication with the authentication system.

22. The electronic device as claimed in claim 21, wherein the control instruction is received from the application processor.

23. The electronic device as claimed in claim 20, further comprising one or more input devices, coupled to the one or more inputs, for generating the biometric input signals.

24. The electronic device as claimed in claim 23, wherein the one or more input devices comprise one or more microphones.

25. The electronic device as claimed in claim 20, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

26. A speaker recognition processor integrated circuit, comprising:
   one or more signal inputs for receiving microphone input signals;
   one or more interfaces for outputting audio data;
   a biometric authentication module;
   a routing module operable to route said microphone input signals to at least one of said biometric authentication module and said one or more interfaces according to the contents of a control register;
   a set of storage registers containing respective predetermined control register contents for each of a plurality of use cases; and
   a control interface for receiving an indication of one or more requested use cases; and
   a controller, coupled to the control interface, the set of storage registers and the control register, for loading control register settings corresponding to the one or more requested use cases, wherein the controller is operable in a mode whereby the routing module is prohibited from routing any signals other than the microphone input signals to said biometric authentication module.

27. The speaker recognition processor according to claim 26, wherein the controller is operable in a mode whereby the routing module is prohibited from routing said microphone input signals to said one or more interfaces.

28. An electronic device, comprising a speaker recognition processor integrated circuit as set out in claim 26.

29. The electronic device according to claim 28, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

* * * * *